United States Patent [19]

Kashihara

[11] Patent Number: 5,157,554
[45] Date of Patent: Oct. 20, 1992

[54] PROJECTING LENS UNIT

[75] Inventor: Takashi Kashihara, Nara, Japan

[73] Assignee: Matsushita Electric Industrial Co., Ltd., Osaka, Japan

[21] Appl. No.: 695,329

[22] Filed: May 3, 1991

[30] Foreign Application Priority Data

May 15, 1990 [JP] Japan .................................. 2-125038

[51] Int. Cl.⁵ .................................................. G02B 7/02
[52] U.S. Cl. .................................... 359/820; 359/823
[58] Field of Search ............... 359/820, 822, 823, 819, 359/509, 512, 513; 358/250, 231, 227; 354/297, 299

[56] References Cited

U.S. PATENT DOCUMENTS

| 3,498,695 | 3/1970 | Brouwer | 359/820 |
| 3,612,664 | 10/1971 | Berman | 359/820 |
| 4,904,054 | 2/1990 | Hiroshima | 359/820 |
| 4,919,519 | 4/1990 | Fantozzi et al. | 359/820 |

Primary Examiner—Loha Ben
Attorney, Agent, or Firm—Stevens, Davis, Miller & Mosher

[57] ABSTRACT

An optical coupling system in which the space between a CRT and a projecting lens, both of which are optically coupled together, is filled with a specific liquid has been employed in the optical system of a projection-type television. In such a system an increase in the temperature of the CRT increases causes the temperature of the specific liquid or optical coupling liquid to increase, resulting in a variation in the refractive index of the liquid which causes a projected image to be defocused. In order to correct such a defocusing of the image, a single lens in contact with the liquid is allowed to move by a small amount in the optical axis direction. In other words, the external periphery of the signal lens is supported by a layer composed of a rubber-like elastic body. In such an arrangement, the volume expansion of the liquid can be utilized to move the single lens by a small amount. The defocusing of the image is thus corrected. A pressure-control system is also provided for controlling an increase in pressure caused by a volume expansion of the liquid inside the space, which is closed in a watertight condition.

12 Claims, 5 Drawing Sheets

VOLUME EXPANSION RATIO OF ETHYLENE GLYCOL
(VOLUME AT 0°C IS REGARDED AS 1)

PROJECTING LENS UNIT

BACKGROUND OF THE INVENTION

The present invention relates to a projecting lens used for enlarging an image appearing on a relatively small CRT (cathode-ray tube) or the like so as to project it onto a screen, and to a projection-type television in which this projecting lens is mounted.

It is a well-known technology that, in order to obtain an image appearing on a TV screen, this TV image which is displayed on a relatively small CRT, and is then enlarged and projected by projecting lens onto wider screen. A system has been employed recently in which a space between a projecting lens and a CRT is filled with a liquid. This liquid has a high transparency and a refractive index close to that of the surface glass pane of the CRT. The projecting lens and the CRT are then optically coupled together. This optical coupling considerably reduces interfacial reflection, thus efficiently transmitting light (an image) radiated from the CRT to the projecting lens. The clarity and contrast of a projected image are thus improved. Such a system is generally referred to as an optical coupling system.

FIG. 1 shows a conventional projecting lens optical unit. Numeral 1 denotes projecting lenses, and numeral 2 denotes an optical coupling (OC) housing. A CRT 3 on which an image is displayed is attached to the right side of the OC housing 2, and an OC lens 4 is attached to the left side of the OC housing 2. This OC lens 4 is positioned on the extreme right of lens elements which constitute the projecting lenses 1. Sealing rubber grooves 5 and 6 are formed in the OC housing 2. Sealing rubbers 7 and 8 are inserted into the sealing rubber grooves 5 and 6, respectively. When the OC lens 4 is attached to the left side of the OC housing 2 with the CRT 3 being attached to the right side of the OC housing 2, the sealing rubbers 7 and 8 are pressed and deformed. The sealing rubbers 7 and 8 are thereby closely press-contact with the OC lens 4 and the CRT 3. The CRT 3 and the OC lens 4 are thus sealed so that a liquid can be contained in a watertight condition. An optical coupling liquid (hereinafter referred to as an OC liquid) 9 is filled into the space enclosed by the OC housing 2, the CRT 3 and the OC lens 4. A filling hole 10 is sealed so that the OC liquid 9 will not leak. At present ethylene glycol, a liquid mixed with ethylene glycol and glycerin, or a liquid mixed with ethylene glycol and water is generally and often used as the OC liquid 9.

As soon as the CRT 3 is operated, an image displayed on a raster screen is enlarged and projected onto a screen (not shown) installed in front of the projecting lenses 1. In a projecting lens unit as constructed in FIG. 1, the OC liquid 9, like the other components of the unit, functions as an important factor in the optical system. A variation in the refractive index of the OC liquid 9 therefore greatly affects the optical properties.

Because the CRT of a projection-type television must output a great amount of light to enlarge and project images, it requires much more electricitY than that used for operating the CRT of a direct viewing tube type television. For this reason, the temperature of the CRT itself, particularly the surface temperature of a raster portion, increases to 100° C. or more. The OC liquid 9 mentioned above also functions as a cooling liquid. Heat generated by operating the CRT is transmitted through the OC liquid 9 to the OC housing 2, where it is dissipated.

As the temperature of the OC liquid 9 increases, its refractive index decreases. The refractive index (Ne line) of, for example, ethylene glycol, is 1.4308 at 20° C., but falls to 1.4146 at 80° C.

As the CRT 3 is operated, the OC liquid temperature gradually increases, reaching an equilibrium at about 80° C. Because the refractive index of the OC liquid 9 varies, even when the focus is precisely adjusted at first at about 20° C., it deviates, as the OC liquid temperature increases. Therefore a projected image becomes out of focus.

As has been described above, when the CRT 3 is operated, the OC liquid temperature inevitably increases, thus causing its refractive index to decrease. For this reason, the optimum focus screen deviates from a position where it is initially positioned, and the projected image thereby becomes out of focus. The conventional art does not cope with such a problem.

The present invention has been made in order to solve the above-mentioned problem. The object of the invention therefore is to provide a simply-constructed projecting lens unit in which a focus screen can be corrected in an effective and rational manner.

SUMMARY OF THE INVENTION

When the temperature of an OC liquid increases and its refractive index decrease, an optimum focus screen moves toward an OC lens (to the left of FIG. 1). It is therefore sufficient to adjust a projecting optical system so as to return a displaced optimum focus screen to the initial position. The optical system of a projection-type television of today is not equipped with a function for controlling the optical system in response to a variation in the OC liquid temperature.

The simulations conducted by the inventor of the present invention have proved that it is also possible to adjust the optimum focus screen by moving the OC lens. As mentioned above, with an increase in the OC liquid temperature, the optimum focus screen moves toward the OC lens. To return the thus-moved optimum focus screen to its initial position, it is sufficient to move the OC lens in small amounts to the left, that is, in the direction in which an OC liquid layer increases in thickness.

In the present invention, the OC lens is bonded to an OC housing by an adhesive, such as one having rubber elasticity. When the OC lens is pressed, a rubber adhesive layer is elastically deformed, thereby making it possible for the OC lens to move in small amounts in the optical axis direction. At this stage, of course, the OC lens is bonded in a watertight condition. In consideration of the thickness, length and the like of the rubber adhesive layer, the spring constant of the rubber adhesive layer must be set so that it serves at a desired strength.

With an increase in the OC liquid temperature, the volume of the OC liquid expands. The pressure of the sealed OC liquid inside the OC housing increases, thus generating force which exerts various components outwardly. The uniform pressure of such an internal pressure acts on the above OC lens. The OC lens, bonded by the rubber-like elastic material, is constructed so that it can move outwardly, that is, in a direction in which the liquid layer increases in thickness.

When the OC liquid temperature increases because of the operation of the CRT, the OC liquid expands in volume and decreases in refractive index. A decrease in the refractive index of the OC liquid causes the optimum focus screen in the initial position to move. For this reason, as the OC liquid temperature increases, a projected image becomes out of focus. To prevent such a phenomenon, it is advisable for the optimum focus screen to be always maintained at the initial position, even when the OC liquid temperature increases. An adjustment to the optical system is required for such maintenance. For such an adjustment, the OC lens, one of the lenses constituting a projecting lens system, is bonded to the OC housing by the adhesive having rubber elasticity. The pressure acting on the OC lens permits the OC lens to move in small amounts.

With an increase in the OC liquid temperature, the OC liquid expands in volume, and the internal pressure of the OC housing increases. The uniform pressure of such an internal pressure acts on the above OC lens. The OC lens, bonded by the rubber-like elastic material, moves outwardly, that is, in a direction in which the liquid layer increases in thickness. The amount of movement of the OC lens is substantially proportional to an increase in the internal pressure. This movement allows the optical system to be automatically adjusted. The optimum focus screen is maintained at the initial position, whereby good projected images are always obtained.

It is necessary to determine with a high degree of precision not only an amount of the movement made by the OC lens for maintaining the optimum focus screen at the initial position, but also an internal pressure required for obtaining this movement. It is also necessary to accurately design a pressure-control system for appropriately adjusting an increase in the internal pressure caused by the volume expansion of the OC liquid.

DESCRIPTION OF THE PREFERRED EMBODIMENTS

Figure 1:
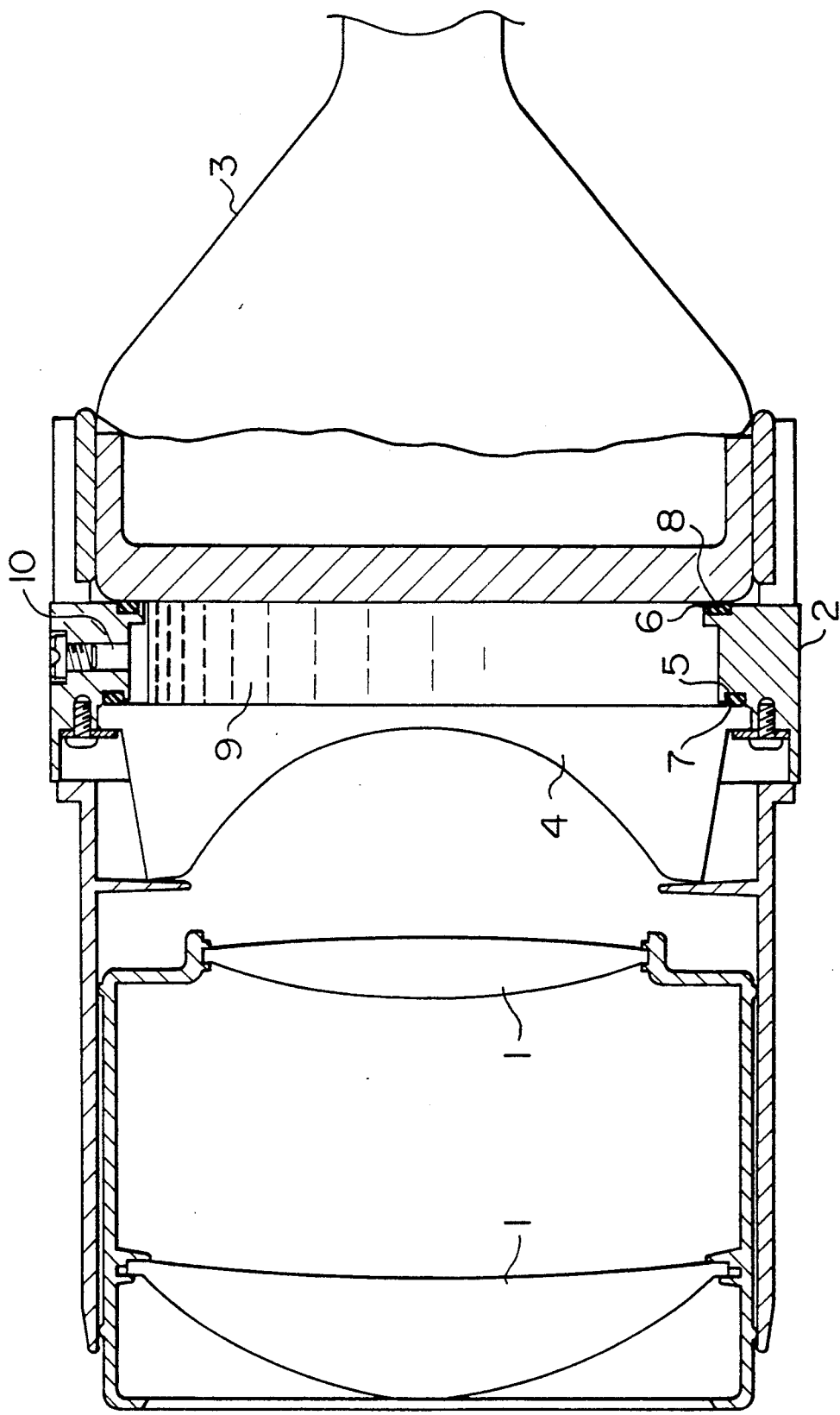
FIG. 1 is a transverse cross-sectional view of the conventional projecting optical unit.
Figure 2:
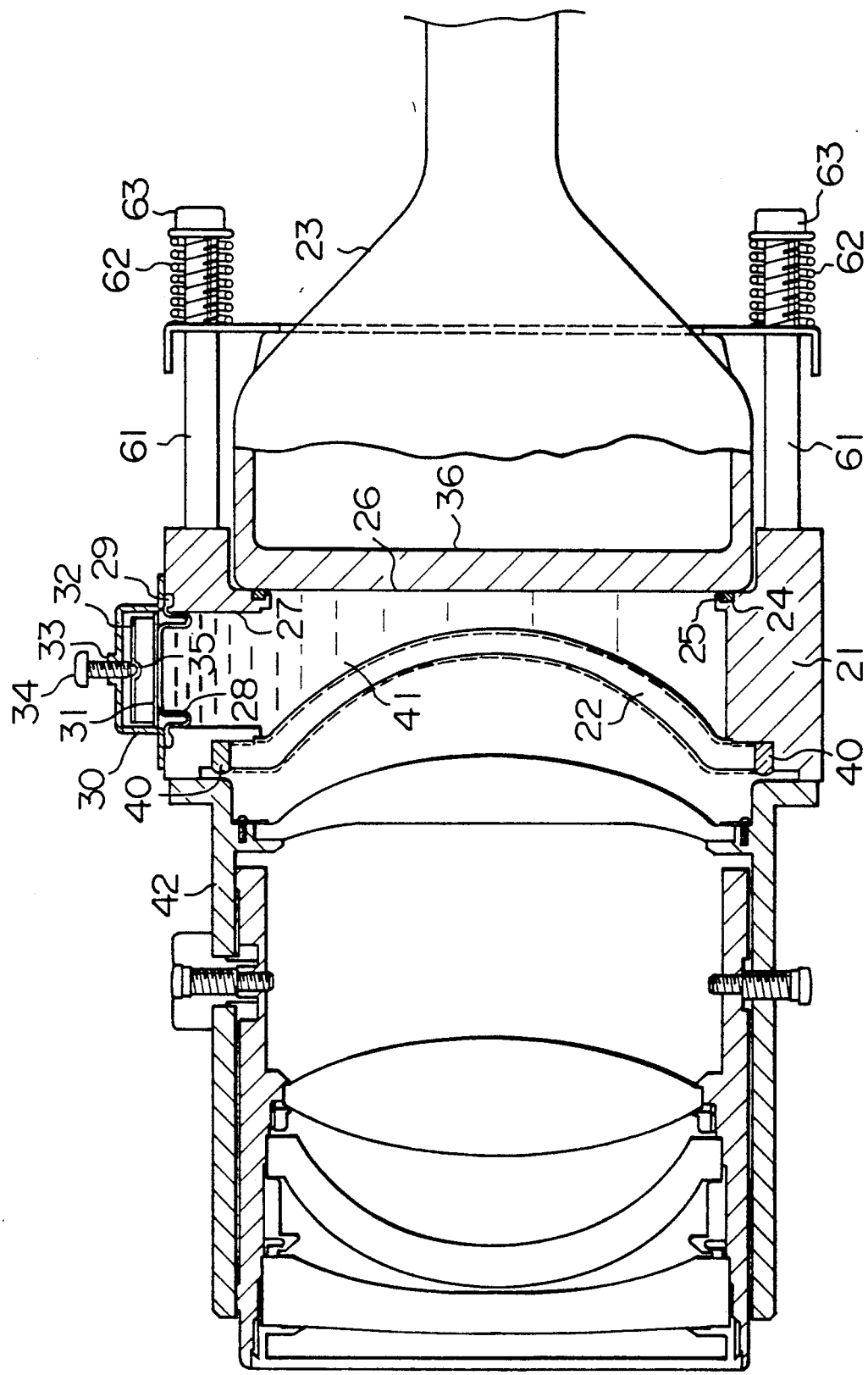
FIG. 2 is a transverse cross-sectional view of a projecting lens unit in accordance with an embodiment of the present invention.

An embodiment of the present invention will be described below with reference to the drawings. FIG. 2 is a sectional side elevation showing the entire construction of a projecting lens unit in accordance with the embodiment.

An OC lens 22 is bonded by an elastomeric adhesive to the left side of an OC housing 21 in a watertight condition. A CRT 23 is attached to the right side of the OC housing 21. An adhesive layer 40 is uniformly formed along the periphery of the OC lens 22. An O-ring groove 24 into which an O-ring 25 is inserted is formed on the surface of the OC housing 21 to which the CRT 23 is attached. When the CRT 23 is pressed against the housing 21, the O-ring 25 is deformed, thus causing the CRT 23 to adhere closely to the surface of a face glass pane 26. The CRT 23 is therefore sealed so that an OC liquid 41 in the OC housing 21 will not leak. In this embodiment, plural fixing shafts 61, springs 62 and spring fasteners 63, all of which are integral parts of the OC housing 21, are used to attach the CRT 23 to the OC housing 21.

A pressure-control opening 27, which also serves as an opening for charging the OC liquid 41, is formed in the upper part of the OC housing 21. A pressure-relief damper 28 made of an elastic material, such as rubber, is disposed in the pressure-control opening 27. A pressure seal portion 29 is formed at the outer edge of the pressure-relief damper 28. A protecting cover 30 presses the pressure seal portion 29 into a groove formed around the pressure-control opening 27. The OC liquid 41 in the OC housing 21 is thus sealed in a watertight condition.

Figure 3:
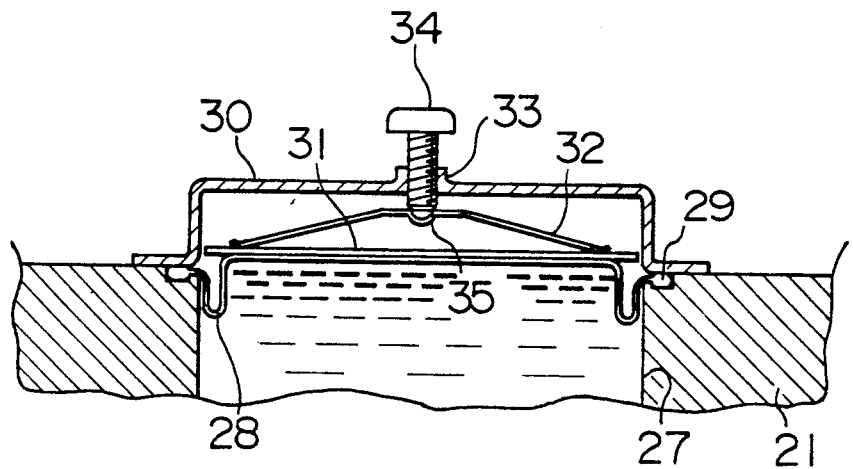
FIG. 3 is a detailed cross-sectional view of a pressure-control portion shown in FIG. 2.

FIG. 3 is a cross-sectional view of a pressure-control portion as viewed from the front. A pressure 31 is disposed on the pressure-relief damper 28, and is constructed so that the pressure acting on a plate spring 32 is evenly applied to the pressure-relief damper 28. A female screw 33 is formed at the center of the protecting cover 30. A screw 34 for adjusting spring pressure (a spring pressure adjusting screw 34) is screwed in the female screw 33. The tip of the spring pressure adjusting screw 34 is engaged with a pivot pot 35 formed at the center of the plate spring 32. By rotating the spring pressure adjusting screw 34 in either a clockwise or counterclockwise direction, it is possible to adjust the spring pressure applied to the pressure-relief damper 28.

The operation of the thus-constructed embodiment will now be described.

In setting an initial focus, an optimum focus screen is adjusted on a fluorescent screen 36 of the CRT 23. When the CRT 23 is operated, it generates heat which is transmitted from the tube screen of the CRT 23 to the OC liquid 41. The temperature of the OC liquid 41 gradually increases. As this temperature increases, the OC liquid 41 expands in volume, but decreases in the refractive index. If the arrangement of an optical system remains unchanged as the OC liquid temperature increases, the optimum focus screen moves toward the OC lens 22. For this reason, a projected image becomes out of focus. To prevent the projected image from becoming out of focus, it is advisable for the optimum focus screen to be maintained at the initial position. This requires an adjustment to the optical system. In the construction of this embodiment, the volume expansion of the OC liquid 41 increases the pressure inside the OC housing 21. This increase is utilized to continuously move the OC lens 22 in small amounts. The projected image is thus prevented from coming out of focus.

As the OC liquid 41 expands, the pressure-relief damper 28 is progressively pressed upward. If the plate spring 32 is not provided, the pressure-relief damper 28 is capable of moving up and down with a little resistance. If the OC lens 22 and the CRT 23 are firmly secured, the amount of the OC liquid 41 equal to its expansion is therefore absorbed by an upward movement of the pressure-relief damper 28. The internal pressure of the OC housing 21 therefore does not increase. If, however, the plate spring 32 is inserted and resistance is applied to the upward movement of the pressure-relief damper 28, internal pressure equal to the spring pressure is generated. Since the OC lens 22 is bonded by the flexible elastomeric adhesive to the OC housing 21, it is moved in a direction (indicated by dotted lines in FIG. 2) in which an OC liquid layer pressure by the internal pressure increases in thickness. The OC lens 22 is moved to a point where it becomes equal to the original internal pressure.

Thus, by rotating the spring pressure adjusting screw 34, it is possible to adjust the pressure urged by the plate spring 32 and acting on the pressure plate 31. This adjustment can vary the internal pressure generated in the OC housing 21. As a result, it is possible to delicately control the amount of movement made by the OC lens 22.

Figure 6:
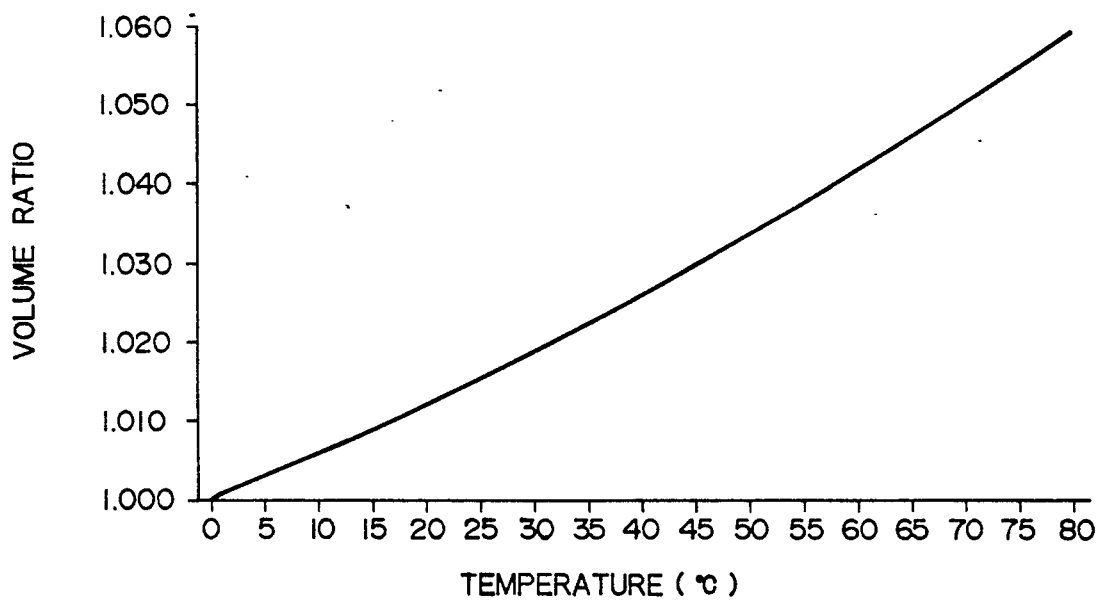
FIG. 6 is a graph showing the relationship between volume expansion and temperature.

The relationship between an increase in the OC liquid temperature and a variation in the refractive index of the same depicts a substantially negative primary curve. An optical simulation was Performed based on the above relationship. The result of the simulation proved that a variation in the amount of a movement made by the OC lens 22 also depicts a substantially primary curve. This movement caused by an increase in the OC liquid temperature is made in order to maintain the optimum focus screen at the initial position. As shown in FIG. 6, the relationship between the volume expansion of the OC liquid 41 and an increase in the OC liquid temperature also depicts a substantially primary curve. Therefore, a variation in the internal pressure of the OC housing 21 also depicts a curve similar to the above primary curve. This leads us to believe that in this relationship there is a primary correlation between an increase in the OC liquid temperature and the amount of a distance at which the OC lens 22 must move. It is thus possible to automatically control the optimum focus screen by optimally setting the elasticity of the adhesive layer 40 or the spring pressure of the pressure-control portion, either of which is a proportional factor of the primary correlation.

Figure 4:
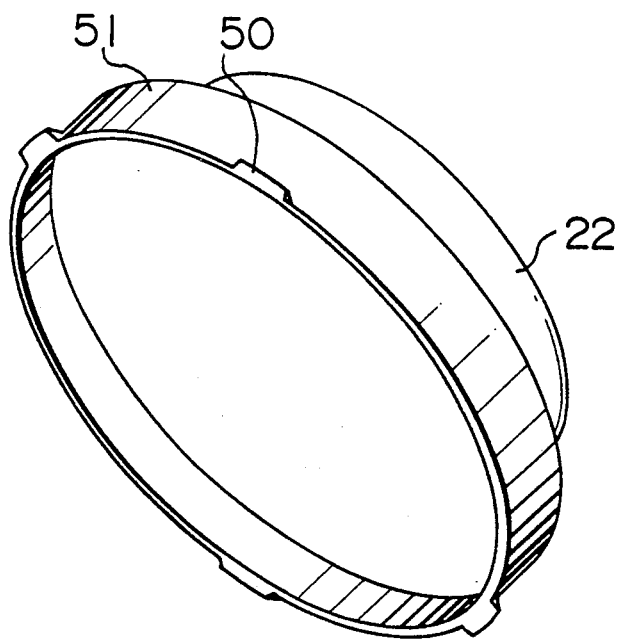
FIG. 4 is a perspective view essentially showing another embodiment of this invention.
Figure 5:
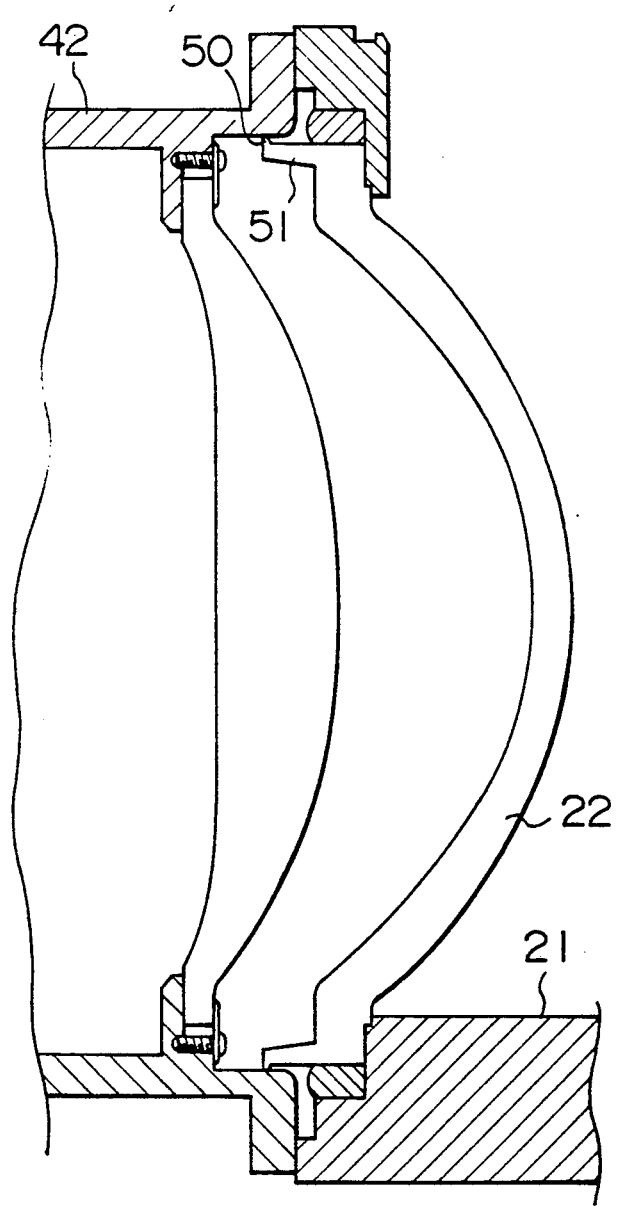
FIG. 5 is a cross-sectional view essentially showing a lens barrel to which an OC lens of FIG. 4 is attached.

FIG. 4 is a perspective view in which a tube portion 51 is arranged along the external peripheral region of the OC lens 22, and in which plural engaging projections 50 are formed at the peripheral edge of the tube portion 51. The axis of the tube portion 51 extends in the same direction as the optical axis. FIG. 5 is a view showing how a lens barrel 42 is attached to the OC housing 21 while the internal peripheral surface of the lens barrel 42 is in contact with the engaging projections 50. Other lenses constituting the projecting lenses are attached to the lens barrel 42. Since the engaging projections 50 are formed integrally with the OC lens 22, they can be extremely accurate concentrically with the optical axis. When the inside of the lens barrel 42 comes in contact with the inside of the engaging projections 50, the axis center of the lens barrel 42 is automatically aligned with respect to the OC housing 21 and the OC lens 22. It is therefore very simple to attach the lens barrel 42.

A lens element bonded to the OC housing is provided with a filtering function. This filtering function very efficiently transmits light having a specific wave range including main spectra of red R, green G and blue B, absorbing and attenuating light having other wave ranges. A thin film is formed which has a filtering function. This filtering function very efficiently transmits light having a specific wavelength range including main spectra of R, G and B while reflecting light having other wave ranges. In the present invention, the advantages of an improved resolution and a wide range of color reproduction can be obtained by employing either of the above two types of filtering functions or both types at the same time. It is desirable to employ such a filtering function for lenses having a uniform thickness.

As has been described above, the present invention provides a simple-constructed, low-cost and highly reliable projecting lens unit in which, without a complicated system or electric circuit, the volume expansion of the OC liquid caused by an increase in the OC liquid temperature, is ingeniously utilized to delicately move the OC lens. It is thus possible to correct a deviation of the optimum focus screen caused by a temperature change or focus characteristics, that is, by an increase in the OC liquid temperature.

What is claimed is:

1. A projection-type display unit comprising:
a display element
a projection lens for projecting light radiated from said display element, and
a closed housing, said display element being attached to said housing and said projection lens having an external peripheral region at which said projection lens is elastically attached to said housing to be movable along an optical axis of said projection lens, said display element, said housing and said projection lens defining a space which is filled with a liquid having a high transparency, whereby said projecting lens elastically attached to said housing moves in association with a volume expansion of said liquid.

2. A projection-type display unit comprising:
a display element,
a group of projection lenses for projecting light radiated from said display element, and
a closed housing to which said display element and said group of projection lenses are attached, said display element, said housing and said group of projection lenses defining a space which is filled with a liquid having a high transparency, a lens element of said group of projection lenses closest to said display element having an external peripheral region at which said lens element is elastically attached to said housing to be movable along an optical axis of said lens element and moving along said optical axis in association with a volume expansion of said liquid.

3. A projection-type display unit comprising:
a display element for displaying an image,
a group of projection lenses for projecting light radiated from said display element, and
a closed housing to which said display element and said group of projection lenses are attached, said display element, said housing and said group of projection lenses defining a space which is filled with a liquid having a high transparency, a lens element of said group of projection lenses closest to said display element moving in association with a volume expansion of said liquid, wherein sad lens element is provided with either one or both of first and second filtering functions, said first filtering function being capable of transmitting light having a specific wavelength range and of absorbing and attenuating light having other wavelength ranges, and said second filtering function being capable of efficiently transmitting light having a specific wave length range and reflecting light having other wavelength ranges.

4. A projection-type display unit comprising:
a display element on which an image is displayed, a group of projection lenses for projecting light radiated from said display element, and a closed housing to which said display element and said projection lenses are attached, wherein said display element, said housing and said projection lenses define a space which is filled with a liquid having a high transparency and a lens element in said group of projection lenses, which is closest to said display element, is attached by an elastic adhesive to said housing, whereby said adhesive is adapted to be elastically deformed so as to allow said lens element to move in association with a volume expansion of said liquid in a direction in which the image is projected.

5. A projection-type display unit according to claim 4, wherein said lens element has a external peripheral edge region formed therein with a cylindrical portion serving as an adhesive margin and is oriented in a direction in which an optical axis extends.

6. A projection-type display unit according to claim 4, wherein a pressure-control means is provided for controlling pressure caused by said volume expansion of the liquid so as to apply a pressure to said lens element in association with an increase in temperature of the liquid, due to said volume expansion of the liquid.

7. A projection-type display unit according to claim 4, wherein an opening is formed in a part of the housing, which is sealed in a watertight condition, and which is disposed therein with a damper diaphragm urged by a spring so as to give a resiliency for absorbing an increase in a pressure inside the opening.

8. A projection-type display unit according to claim 4, wherein said lens element is formed with a plurality of projections at its external periphery, which come in contact with an internal peripheral surface of said housing to which said group of projection lenses excepting said lens element are attached.

9. A projection-type display unit according to claim 4, wherein said lens element is provided with a filtering function such that light having a specific wavelength range can be efficiently transmitted while light having other wavelength ranges is absorbed and attenuated.

10. A projection-type display unit comprising:

a display element;

a projection lens unit having an outer peripheral portion and an optical axis, for projecting light radiated from said display element;

a housing to which said display element and said projection lens unit are attached so as to define a closed space in said housing, said projection lens being attached at said outer peripheral portion resiliently to said housing so as to be movable along said optical axis;

a liquid which has a high transparency and is filled in said closed space so that the light projected from said display element is transmitted to said projection lens unit therethrough; and a pressure control means for controlling a pressure of said liquid filled in said closed space.

11. A projection-type display unit as in claim 10, wherein said projection lens unit comprises a plurality of lens element, one of said lens elements which is adjacent to said housing being attached resiliently to said housing at the outer peripheral portion thereof.

12. A projection-type display unit as in claim 11, wherein at least one of said lens elements has a filtering function such that light having a specific wavelength range is transmitted therethrough with a high degree of efficiency but light having another wavelength range is absorbed and/or reflected thereby.

* * * * *